(12) United States Patent
Tsai et al.

(10) Patent No.: US 10,768,662 B2
(45) Date of Patent: Sep. 8, 2020

(54) PORTABLE ELECTRONICAL DEVICE

(71) Applicant: PEGATRON CORPORATION, Taipei (TW)

(72) Inventors: Chen-Yu Tsai, Taipei (TW); Chien-Wei Chen, Taipei (TW); Chung-Wei Lee, Taipei (TW); Chao-Kuo Chan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/581,634

(22) Filed: Sep. 24, 2019

(65) Prior Publication Data

US 2020/0166964 A1 May 28, 2020

(30) Foreign Application Priority Data

Nov. 28, 2018 (TW) .............................. 107142514 A (51) Int. Cl.
*H05K 5/00* (2006.01)
*G06F 1/16* (2006.01)

(52) U.S. Cl.
CPC ............ *G06F 1/1616* (2013.01); *G06F 1/169* (2013.01); *G06F 1/1624* (2013.01); *G06F 1/1647* (2013.01); *G06F 1/1667* (2013.01)

(58) Field of Classification Search
CPC ........................................................ G06F 1/16
See application file for complete search history.

(56) References Cited

U.S. PATENT DOCUMENTS

| 8,670,244 B2 * | 3/2014 | Wakimoto | G06F 1/1626 361/755 |
| 2004/0108968 A1 | 6/2004 | Finke-Anlauff | |
| 2014/0211395 A1 * | 7/2014 | Lin | G06F 1/1669 361/679.17 |

FOREIGN PATENT DOCUMENTS

| JP | H10240409 | 9/1998 |
| KR | 20040104889 | 12/2004 |
| TW | 201124824 | 7/2011 |
| TW | 201430528 | 8/2014 |

(Continued)

OTHER PUBLICATIONS

"Search Report of Europe Counterpart Application", dated Apr. 30, 2020, p. 1-p. 10.

(Continued)

*Primary Examiner* — Jerry Wu
(74) *Attorney, Agent, or Firm* — J.C. Patents (57) ABSTRACT

The present disclosure discloses a portable electronic device, comprising a first display panel, a second display panel and a keyboard. The second display panel is pivotally connected to the first display panel. The second display panel comprises a display screen and at least one guide magnet arranged below the display screen. The keyboard is detachably arranged above the display screen of the second display panel. The keyboard comprises at least one magnetic element. The keyboard can be controlled to move relative to the display screen along a moving direction by means of the magnetic attraction force between the at least one magnetic element and the at least one guide magnet, wherein the moving direction is perpendicular to a side edge of the second display panel pivotally connected to the first display panel.

11 Claims, 9 Drawing Sheets

(56) References Cited

FOREIGN PATENT DOCUMENTS

TW  201737015  10/2017
TW  201827980  8/2018

OTHER PUBLICATIONS

"Office Action of Korea Counterpart Application" with English translation thereof, dated Jun. 8, 2020, p. 1-p. 10.

* cited by examiner

PORTABLE ELECTRONICAL DEVICE

CROSS-REFERENCE TO RELATED APPLICATION

This application claims the priority benefit of Taiwan application serial no. 107142514, filed on Nov. 28, 2018. The entirety of the above-mentioned patent application is hereby incorporated by reference herein and made a part of this specification.

BACKGROUND

Technical Field

The present disclosure relates to a portable electronic device, and particularly relates to a portable electronic device with two touch display panels.

Description of Related Art

With the development of the science and technology, the touch technology is becoming more mature and the processor performance is improved, so that portable electronic devices such as notebook computers and tablet computers can perform more functions. Operators who design or manufacture portable electronic devices need to provide various types of portable electronic devices according to requirements of different users.

In the case of notebook computers, a notebook computer composed of two touch display panels is further provided on the market, and the display surfaces of the two touch display panels are respectively positioned on the B surface and the C surface of the notebook computer. Generally, this type of portable electronic device is called a dual-screen notebook computer, and a user can use the two touch display panels to achieve an interactive effect. This type of notebook computer does not have a physical keyboard, and touch input is directly performed on the display surfaces of two touch display panels or the display surface of one touch display panel. For example, for some users who have drawing requirements, the display surface of one touch display panel can be used as a drawing board. In some usage modes, a virtual keyboard can also be displayed on the touch display panel of the C surface, but a user still clicks the virtual keyboard of the C surface by touch.

However, for a user who is accustomed to using a physical keyboard, the physical keyboard only can be electrically connected additionally. In other words, in addition to carrying a dual-screen notebook computer, the user needs to carry the physical keyboard, which is quite inconvenient for the user and is necessary for improvement.

SUMMARY

In view of the above problem, the present disclosure is directed to a portable electronic device, comprising a first display panel, a second display panel, and a keyboard. Guide magnets are arranged on the second display panel and magnetic elements are arranged on the keyboard, so that the keyboard can be arranged on the second display panel and can slide among different positions to solve the problem that a conventional dual-screen notebook computer cannot implement input through a physical keyboard.

In order to achieve the above purpose, the present disclosure provides a portable electronic device, comprising a first display panel, a second display panel, and a keyboard. The second display panel is pivotally connected to the first display panel. The second display panel comprises a display screen and at least one guide magnet. The at least one guide magnet is arranged below the display screen. The keyboard is detachably arranged above the display screen of the second display panel. The keyboard comprises at least one magnetic element. The keyboard can be controlled to move relative to the display screen along a moving direction by means of the magnetic attraction force between the at least one magnetic element and the at least one guide magnet, wherein the moving direction is perpendicular to a side edge of the second display panel pivotally connected to the first display panel.

Based on the above, the portable electronic device of the present disclosure is provided with the first display panel, the second display panel, and the keyboard, and the keyboard is detachably arranged on the second display panel, so that a user can directly operate the keyboard to achieve an effect of inputting with a physical keyboard. Furthermore, the second display panel comprises guide magnets, and the keyboard comprises magnetic elements, so that the keyboard can be controlled to slide on the display screen with the guide magnets and the magnetic elements.

Furthermore, the keyboard in different positions can be used with different usage modes, so that the portable electronic device (dual-screen notebook computer) has more diverse usage modes.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A to FIG. 3C are actuation schematic diagrams of the keyboard as shown in FIG. 1 moving on the second display panel.

DESCRIPTION OF THE EMBODIMENTS

In order to more clearly understand the features, contents and advantages of the present disclosure and the effects thereof, the present disclosure will be described in detail below with reference to the accompanying drawings in the form of embodiments.

Figure 1:
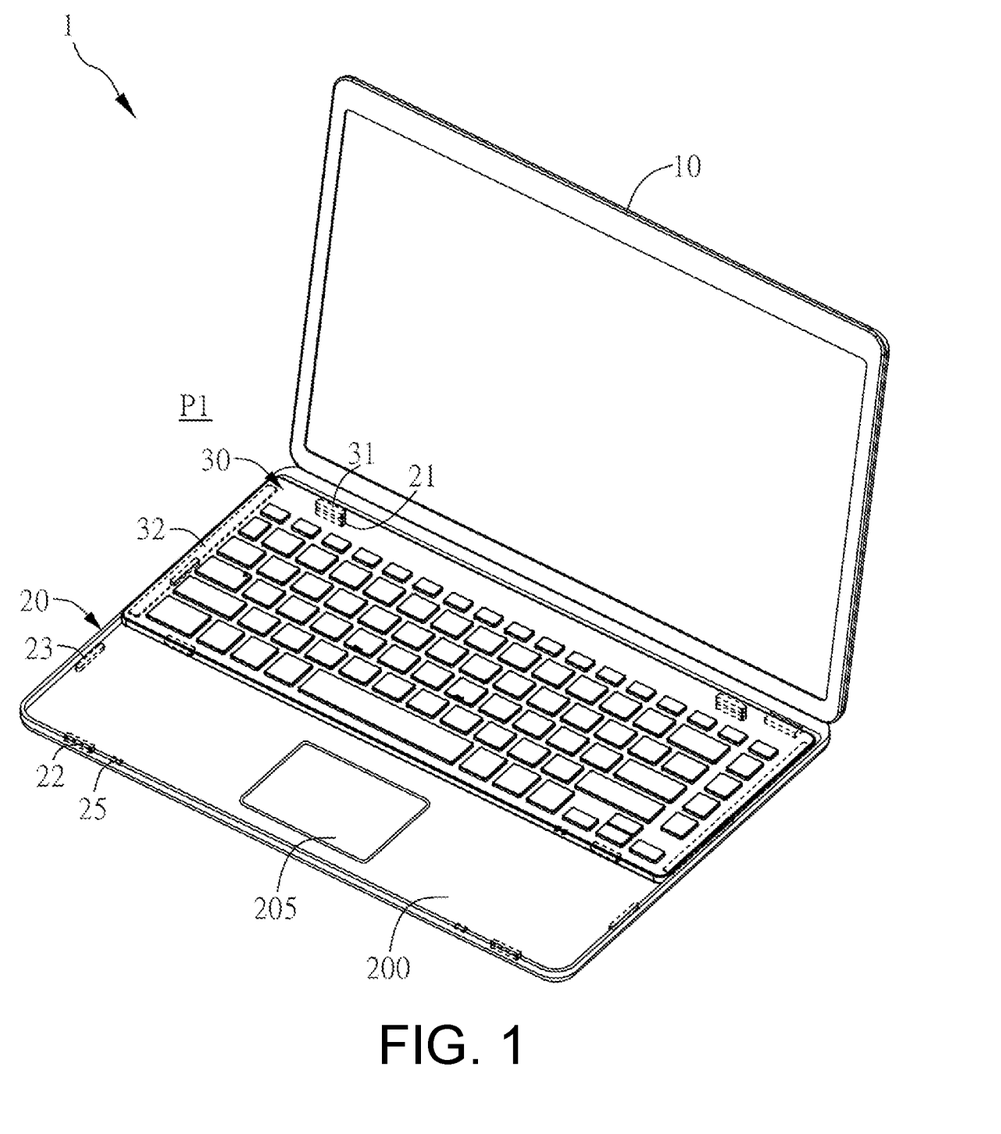
FIG. 1 is a schematic diagram of a portable electronic device according to a first embodiment of the present disclosure.
Figure 2:
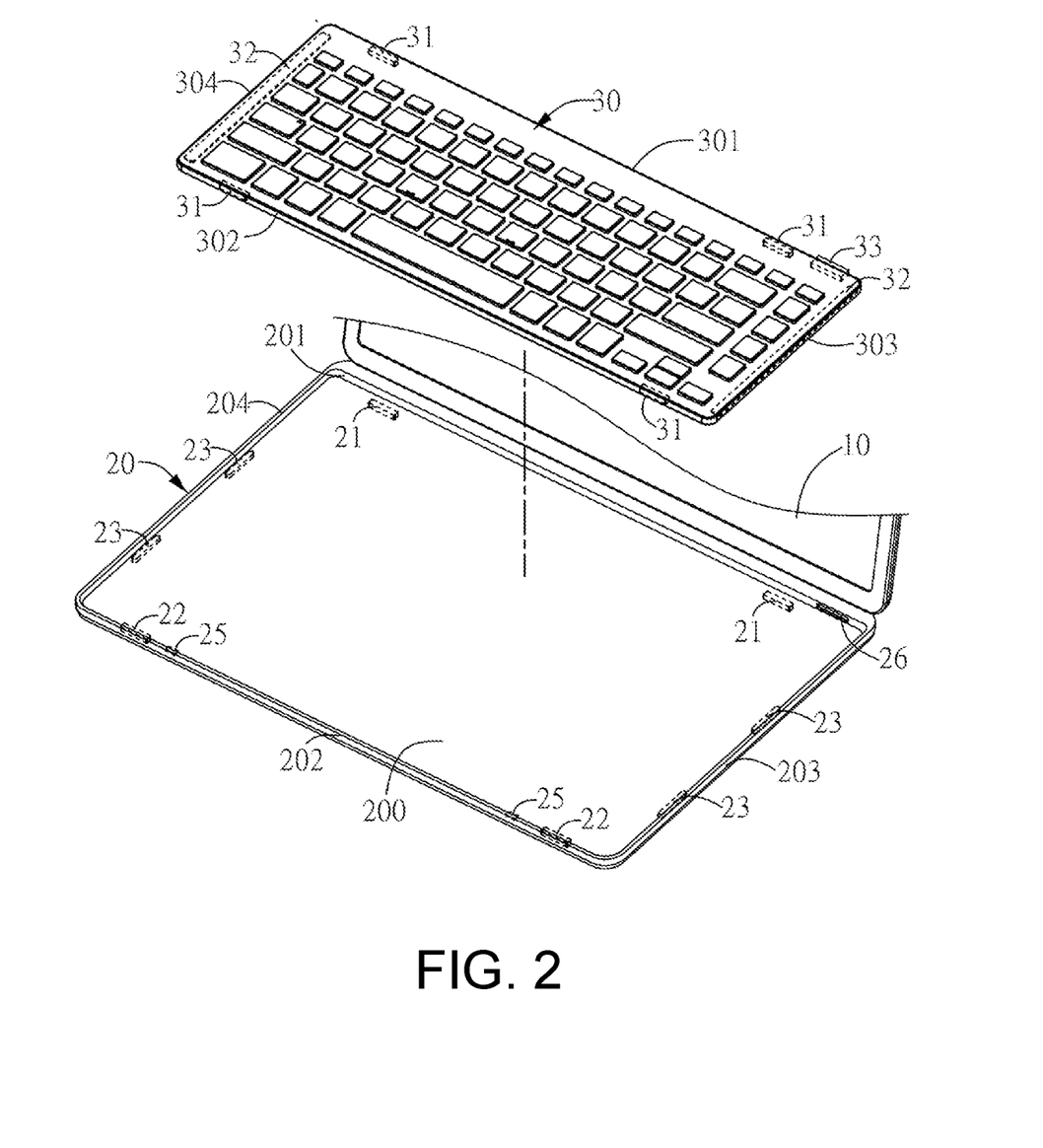
FIG. 2 is an exploded diagram of a second display panel and a keyboard as shown in FIG. 1.

FIG. 1 is a schematic diagram of a portable electronic device according to a first embodiment of the present disclosure, FIG. 2 is an exploded diagram of a second display panel and a keyboard as shown in FIG. 1, and the present embodiment refers to FIG. 1 and FIG. 2. Firstly, the portable electronic device 1 of the present embodiment is illustrated by taking a dual-screen notebook computer as an example. That is, the portable electronic device 1 is composed of two touch display panels which are respectively a first display panel 10 and a second display panel 20 herein. In other words, the portable electronic device 1 of the present embodiment comprises a first display panel 10 and a second display panel 20, and the second display panel 20 is pivotally connected to the first display panel 10 and can be electrically connected to the first display panel 10 in a wired or wireless mode, so that signal and data transmission can be performed between the first display panel 10 and the second display panel 20.

In the present embodiment, one side edge of the second display panel 20 is pivotally connected to the first display panel 10, in which the first display panel 10 can be used as A and B elements of the portable electronic device 1, and the second display panel 20 can be used as C and D elements of the portable electronic device 1. In order to clearly explain the arrangement positions of all elements, four side edges of the second display panel 20 are respectively named as a first side edge 201, a second side edge 202, a third side edge 203, and a fourth side edge 204, in which the first side edge 201 of the second display panel 20 is pivotally connected to the side edge of the first display panel 10, the second side edge 202 is opposite to the first side edge 201, the third side edge 203 and the fourth side edge 204 are positioned at two adjacent sides of the first side edge 201, and the third side edge 203 is opposite to the fourth side edge 204.

Furthermore, the portable electronic device 1 further comprises a keyboard 30, and the keyboard 30 is detachably arranged above the display screen 200 of the second display panel 20, namely the C surface of the portable electronic device 1. Similarly, in order to clearly explain the arrangement positions of all elements, four side edges of the keyboard 30 are respectively named as a fifth side edge 301, a sixth side edge 302, a seventh side edge 303, and an eighth side edge 304, in which the sixth side edge 302 is opposite to the fifth side edge 301, and the eighth side edge 304 is opposite to the seventh side edge 303. When the keyboard 30 is placed above the display screen 200, the fifth side edge 301, the sixth side edge 302, the seventh side edge 303, and the eighth side edge 304 are sequentially corresponding to the first side edge 201, the second side edge 202, the third side edge 203, and the fourth side edge 204.

Figure 3A:
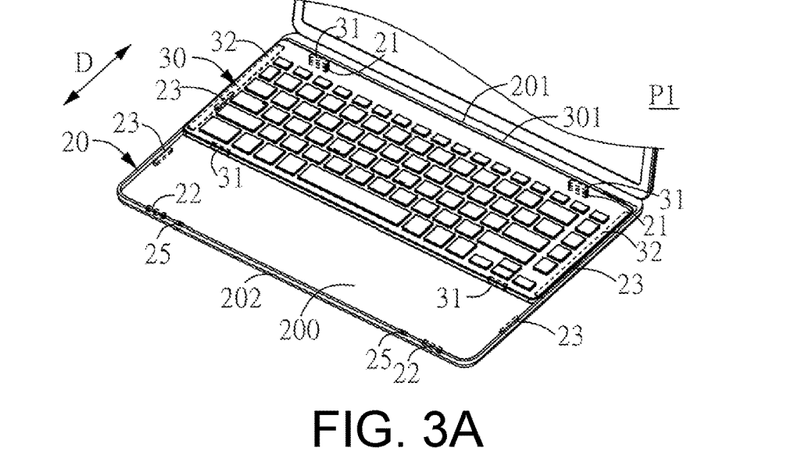
Figure 3B:
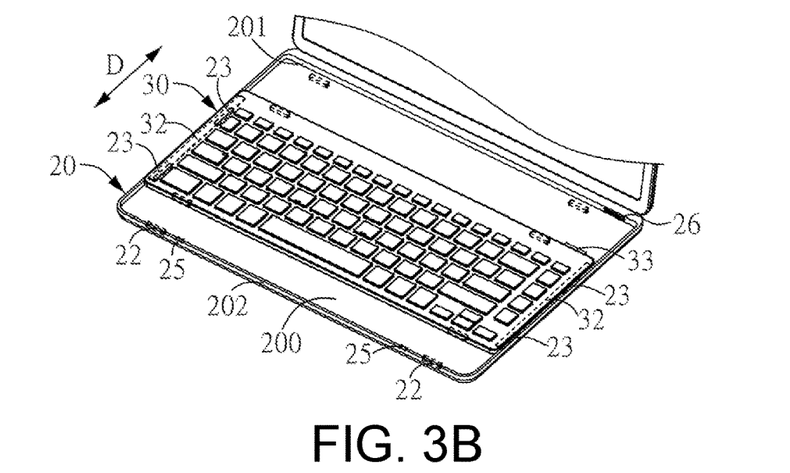
Figure 3C:
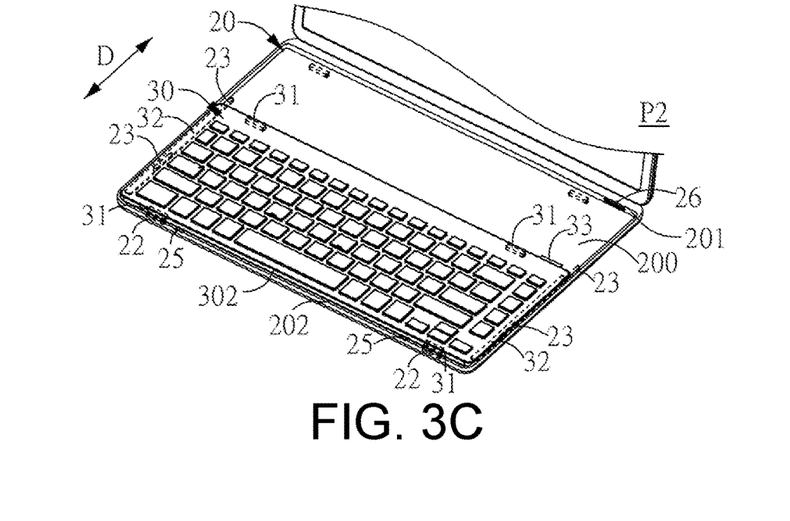

References are made to FIG. 3A to FIG. 3C. FIG. 3A to FIG. 3C are actuation schematic diagrams of the keyboard as shown in FIG. 1 moving on the second display panel. As shown in FIG. 3A to FIG. 3C, the keyboard 30 can slide on the display screen 200 along a moving direction D. For example, the keyboard 30 can slide between a first position P1 (as shown in FIG. 3A) and a second position P2 (as shown in FIG. 3C). In the present embodiment, the moving direction D is perpendicular to the first side edge 201 of the second display panel 20 pivotally connected to the first display panel 10. As shown in FIG. 3A, the first position P1 of the present embodiment is a position in which the keyboard 30 is close to the first display panel 10. As shown in FIG. 3C, the second position P2 is a position in which the keyboard 30 is away from the first display panel 10.

In some embodiments, as shown in FIG. 2, the second display panel 20 comprises at least one first positioning magnet 21 and at least one second positioning magnet 22, and correspondingly, the keyboard 30 comprises at least one third positioning magnet 31 in order to position the keyboard 30 in the first position P1 or the second position P2.

Furthermore, the second display panel 20 further comprises at least one guide magnet 23, the keyboard 30 further comprises at least one magnetic element 32, and the keyboard 30 can be controlled to slide along the moving direction D between the first position P1 and the second position P2 with a smaller magnetic attraction force between the guide magnet 23 and the magnetic element 32. It should be noted that the smaller magnetic attraction force herein means that the magnetic attraction force between the guide magnet 23 and the magnetic element 32 is smaller than the magnetic attraction force between the first positioning magnet 21, the second positioning magnet 22, and the third positioning magnet 31, in which the first positioning magnet 21, the second positioning magnet 22, the third positioning magnet 31, and the guide magnet 23 are all magnets, but the disclosure is not limited thereto. The arrangement relationship between each magnet and the magnetic element 32 is described below by taking the first embodiment as an example.

Referring to FIG. 2, in the present embodiment, the second display panel 20 comprises two first positioning magnets 21 and two second positioning magnets 22, and the first positioning magnets 21 and the second positioning magnets 22 are arranged below the display screen 200 of the second display panel 20, in which the two first positioning magnets 21 are spaced apart on the first side edge 201, and the two second positioning magnets 22 are spaced apart on the second side edge 202. Correspondingly, the keyboard 30 is provided with four third positioning magnets 31, in which two third positioning magnets 31 are positioned on the fifth side edge 301, and the other two third positioning magnets 31 are positioned on the sixth side edge 302 so as to correspond to the positions of the first positioning magnets 21 and the second positioning magnets 22 of the second display panel 20. Preferably, the third positioning magnets 31 are arranged at the bottom of the keyboard 30 so as to be close to the second display panel 20. In the present disclosure, whether the third positioning magnets 31 are arranged on the inner surface or the outer surface of the keyboard 30 is not limited. Preferably, the third positioning magnets 31 can be arranged on the inner surface of the keyboard 30, namely inside the keyboard 30, so as to keep the integrity of the appearance of the keyboard 30.

Furthermore, the second display panel 20 is provided with four guide magnets 23, and the guide magnets 23 are also arranged below the display screen 200 of the second display panel 20, in which two guide magnets 23 are spaced apart on the third side edge 203, and the other two guide magnets 23 are spaced apart on the fourth side edge 204. Correspondingly, the keyboard 30 is provided with two magnetic elements 32 positioned on the seventh side edge 303 or the eighth side edge 304. The magnetic elements 32 are arranged at the bottom of the keyboard 30 and can be positioned on the inner surface or the outer surface of the keyboard 30. The magnetic elements 32 of the present embodiment are positioned on the inner surface of the keyboard 30 in order to keep the integrity of the appearance of the keyboard 30. The magnetic elements 32 of the present embodiment are strip-shaped, and the long axis direction of the magnetic elements 32 is parallel to the moving direction D of the keyboard 30 so as to guide the keyboard 30 to move along the moving direction D.

References are made to FIG. 2 and FIG. 3A, when the keyboard 30 is in the first position P1, the fifth side edge 301 of the keyboard 30 is close to the first side edge 201 of the second display panel 20. The third positioning magnet 31 positioned on the fifth side edge 301 and the first positioning magnet 21 positioned on the first side edge 201 can be magnetically attracted to each other, therefore, the keyboard 30 is fixed in the first position P1. At this time, the guide magnet 23 close to the first side edge 201 and the magnetic element 32 are also magnetically attracted to each other. Subsequently, a user can apply a force to the keyboard 30 to push the keyboard 30 to move towards the direction of the second side edge 202. When the force applied by the user is greater than the magnetic attraction force between the first positioning magnet 21 and the third positioning magnet 31, the keyboard 30 can be pushed to move towards the direction of the second side edge 202, and the guide magnet 23 close to the second side edge 202 and the magnetic element 32 can be magnetically attracted to each other so as to guide the keyboard 30 to continue moving towards the direction of the second side edge 202, as shown in FIG. 3B. When the keyboard 30 moves to the second position P2, the sixth side edge 302 of the keyboard 30 is close to the second side edge 202 of the second display panel 20. The third positioning magnet 31 positioned on the sixth side edge 302 and the second positioning magnet 22 positioned on the second side edge 202 are magnetically attracted to each other, therefore, the keyboard 30 is fixed in the second position P2, as shown in FIG. 3C.

Therefore, the first positioning magnet 21 and the second positioning magnet 22 of the second display panel 20 are respectively used to position the keyboard 30 in the first position P1 and the second position P2, and the guide magnet 23 is used to limit the moving region of the keyboard 30 and can guide the keyboard 30 to move from the first position P1 to the second position P2. As shown in FIG. 2, in the present embodiment, both the third side edge 203 and the fourth side edge 204 of the second display panel 20 are provided with guide magnets 23, and the seventh side edge 303 and the eighth side edge 304 of the keyboard 30 are correspondingly provided with magnetic elements 32. In other embodiments, the guide magnets 23 and the magnetic elements 32 can also be arranged on only one side edge of the second display panel 20 and the keyboard 30. For example, the second display panel 20 can also be provided with two guide magnets 23 which are spaced apart on the third side edge 203 or the fourth side edge 204. Correspondingly, the keyboard 30 is provided with one magnetic element 32 which is arranged on the seventh side edge 303 or the eighth side edge 304 according to the position of the guide magnet 23. Furthermore, the present disclosure does not limit the numbers of the guide magnets 23 and the magnetic elements 32, any other number of guide magnets 23 and magnetic elements 32 can be arranged.

Preferably, the upper surface of the display screen 200 of the second display panel 20 is a groove, and the keyboard 30 can be contained in the groove to limit the moving region of the keyboard 30 so as to prevent the keyboard 30 from exceeding the third side edge 203 or the fourth side edge 204 of the second display panel 20 when moving.

Figure 4:
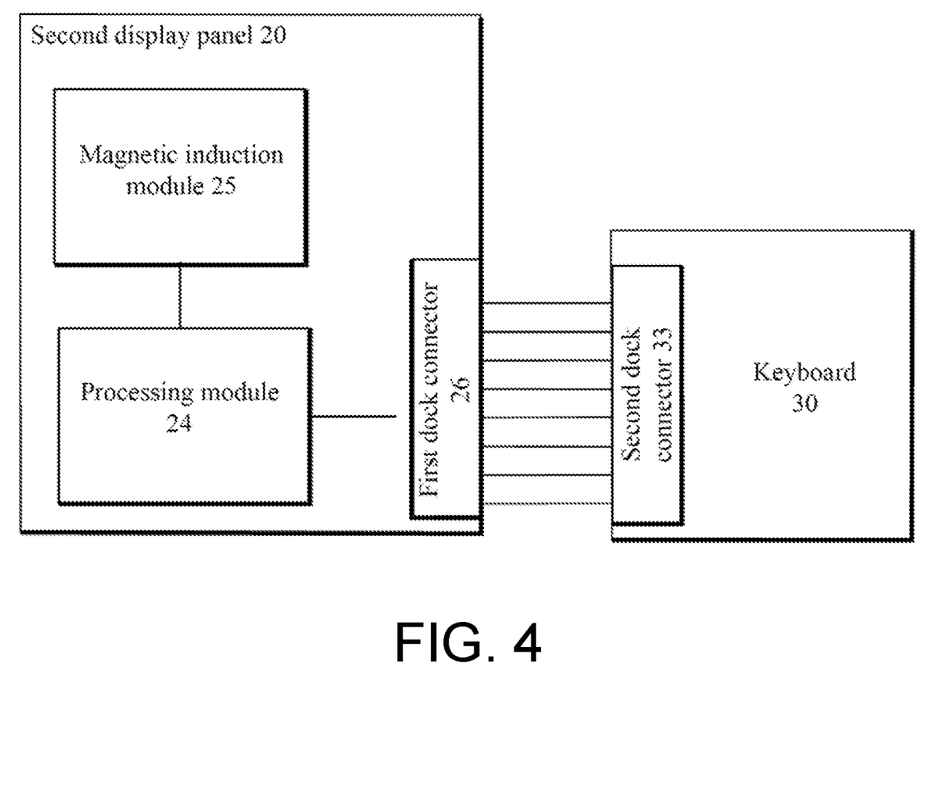
FIG. 4 is a block diagram of the second display panel and the keyboard as shown in FIG. 1.

FIG. 4 is a block diagram of the second display panel and the keyboard as shown in FIG. 1, and references are made to FIG. 2 and FIG. 4. Preferably, the second display panel 20 can also execute different usage modes according to different positions (first position P1 or second position P2) of the keyboard 30. Specifically, the second display panel 20 of the present embodiment further comprises a processing module 24, a magnetic induction module 25, and a first connector 26, and the magnetic induction module 25 and the first connector 26 are electrically connected to the processing module 24 respectively, in which the magnetic induction module 25 is arranged adjacent to the second positioning magnet 22, and the first connector 26 is arranged on the first side edge 201. Correspondingly, the keyboard 30 further comprises a second connector 33 arranged on the fifth side edge 301.

When the keyboard 30 is in the first position P1, the first connector 26 is electrically connected to the second connector 33, and the first connector 26 can transmit a connection signal to the processing module 24. After the processing module 24 receives the connection signal, a first usage mode can be executed, as shown in FIG. 1. In the present embodiment, the processing module 24 executes the first usage mode, including controlling the second display panel 20 to display a touch panel 205 on a block close to the second side edge 202 for a user to operate a cursor position. In other words, the first usage mode is an operation mode of a common notebook computer, the B surface (first display panel 10) is used as a display screen, and the C surface is provided with a physical keyboard (keyboard 30) and the touch panel 205.

Figure 5:
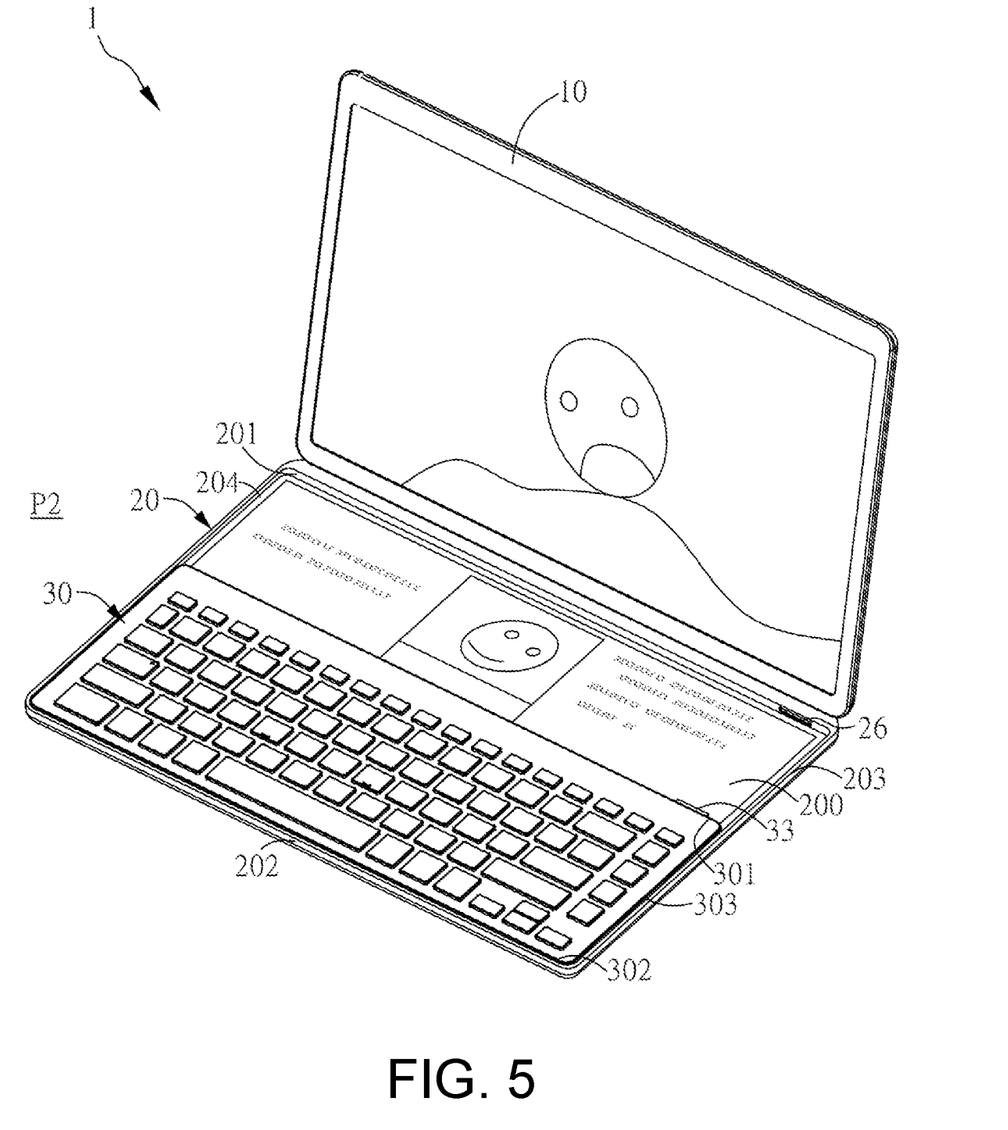
FIG. 5 is a schematic diagram of the portable electronic device as shown in FIG. 1 in a second usage mode.

When the keyboard 30 is in the second position P2, the third positioning magnet 31 and the second positioning magnet 22 are magnetically attracted to each other to generate a magnetic force change; when the magnetic induction module 25 arranged adjacent to the second positioning magnet 22 detects the magnetic force change, an induction signal can be transmitted to the processing module 24; and when the processing module 24 receives the induction signal from the magnetic induction module 25, a second usage mode can be executed according to the induction signal. In the present embodiment, the processing module 24 executes the second usage mode, such as controlling the second display panel 20 to display a chat window on a block close to the first side edge 201, as shown in FIG. 5. FIG. 5 is a schematic diagram of the portable electronic device as shown in FIG. 1 in the second usage mode. At present, there are many video playing interfaces, game interfaces or live interfaces having a chat room interface (such as chat windows), and when a user is playing the game, a chat window can be used for transmitting messages, such that the user can interact with other users. However, a common notebook computer displays a game interface and a chat window on the same display panel, and thus needs to switch the game interface and the chat window frequently, resulting in inconvenience in use. By comparison, in the present embodiment, the keyboard 30 can be moved to the second position P2 (i.e., the processing module 24 executes the second usage mode) so as to display the game interface on the first display panel 10 and display the chat window on the second display panel 20, so that the user does not need to switch the game interface and the chat window during operation.

Furthermore, the keyboard 30 of the present embodiment can be coupled with the second display panel 20 in a wireless mode. For example, an input signal from the keyboard 30 can be transmitted in a Bluetooth mode. When the keyboard 30 is in the first position P1, the first connector 26 can be electrically connected to the second connector 33, the processing module 24 can receive a connection signal to execute the first usage mode, the processing module 24 also can control a power supply module (not shown in figures) to supply power to the keyboard 30, and the power is transmitted by the first connector 26 and the second connector 33.

Figure 6:
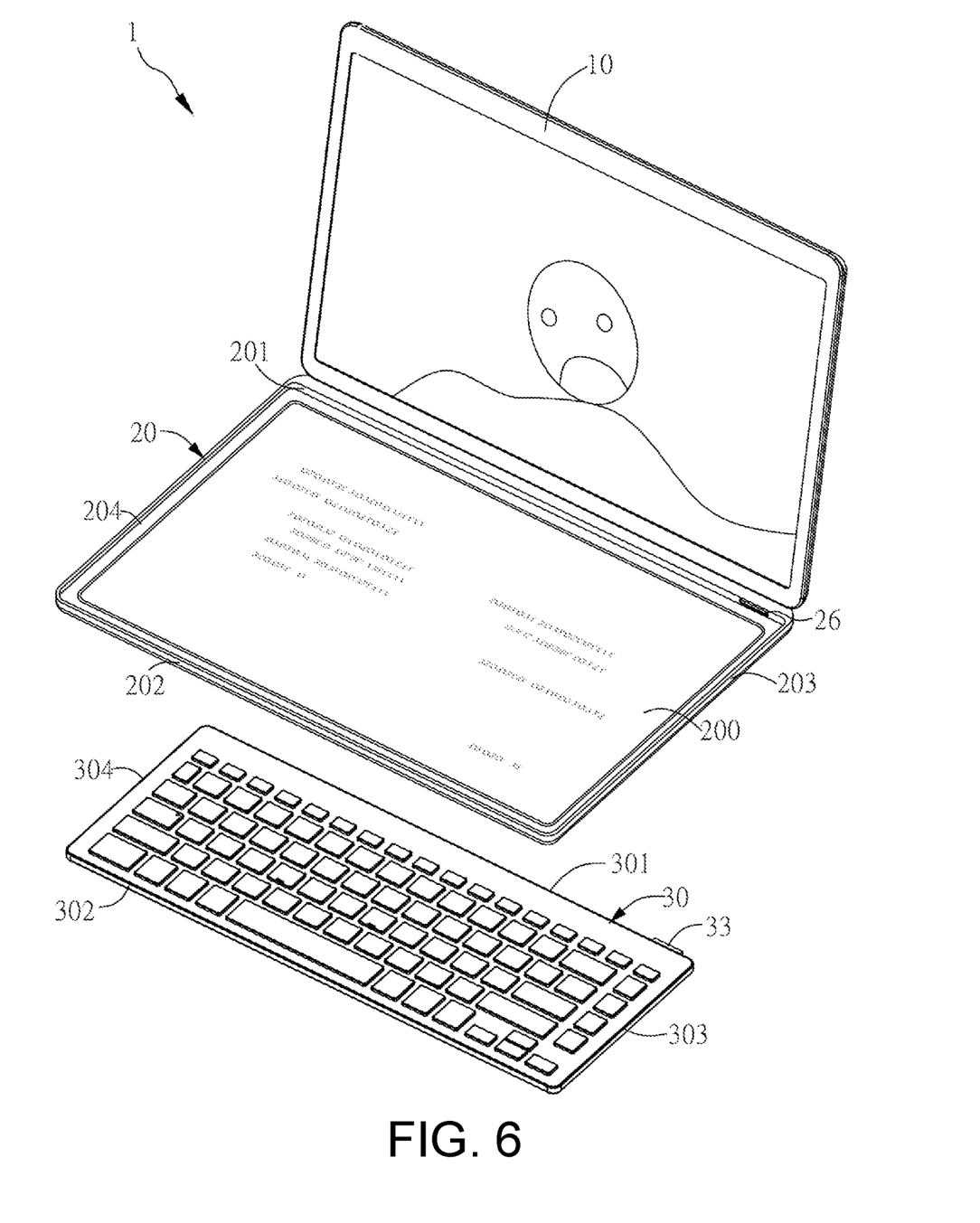
FIG. 6 is a schematic diagram of the portable electronic device as shown in FIG. 1 in a third usage mode.

The portable electronic device of the present embodiment can also have a third usage mode, as shown in FIG. 6. FIG. 6 is a schematic diagram of the portable electronic device as shown in FIG. 1 in the third usage mode. In the third usage mode, a user can directly remove and use the keyboard 30, and the first display panel 10 and the second display panel 20 can be used for displaying simultaneously. Furthermore, the first display panel 10 and the second display panel 20 can be directly used as a common dual-screen display device, and the first display panel 10 and the second display panel 20 can be erected to serve as a usage mode for reading.

Figure 7:
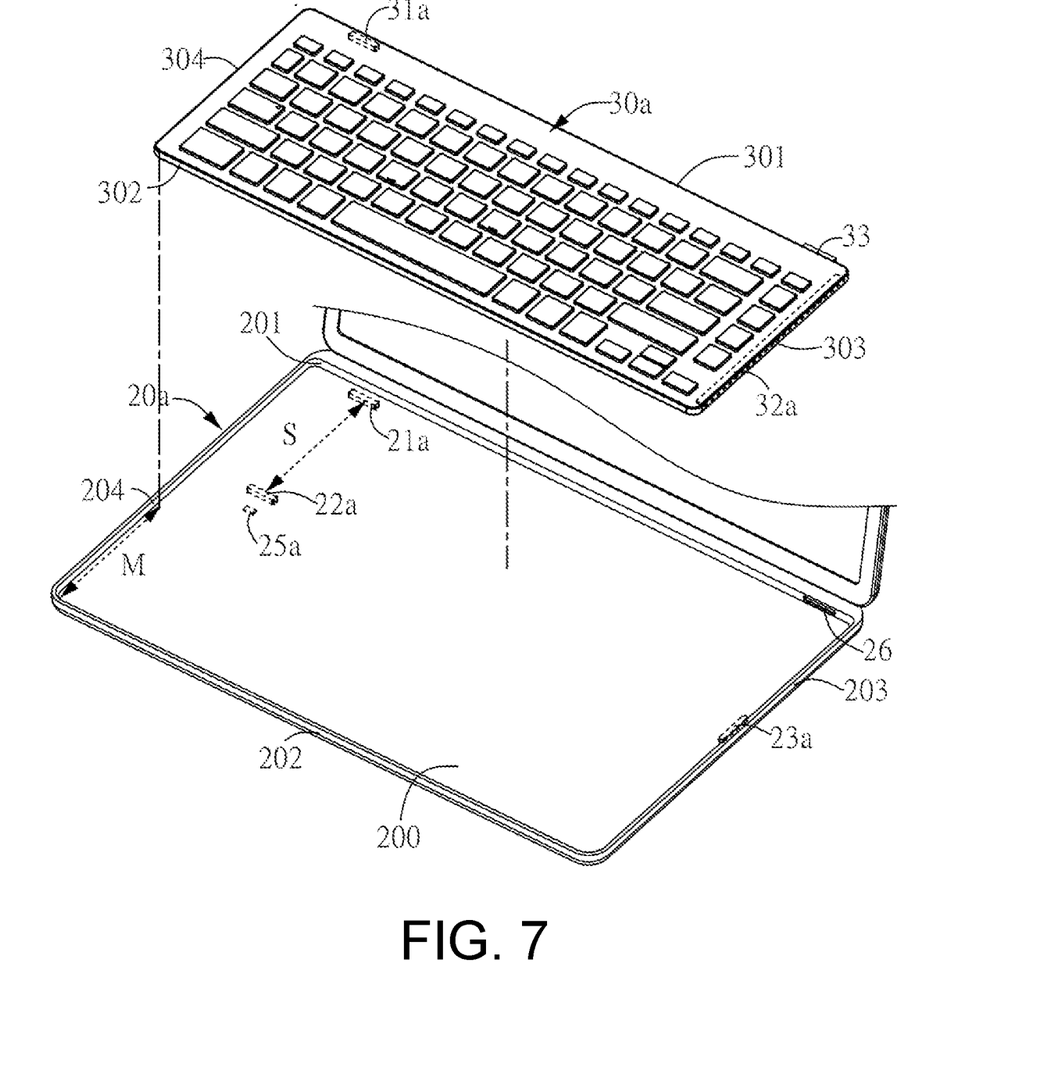
FIG. 7 is an exploded diagram of a second display panel and a keyboard according to a second embodiment of the present disclosure.

FIG. 7 is an exploded diagram of a second display panel and a keyboard according to a second embodiment of the present disclosure and the present embodiment refers to FIG. 7. In the present embodiment, a second display panel 20a comprises a first positioning magnet 21a, a second positioning magnet 22a, and a guide magnet 23a, and a keyboard 30a comprises a third positioning magnet 31a and a magnetic element 32a. The difference between the present embodiment and the first embodiment is the numbers and arrangement positions of the first positioning magnet 21a, the second positioning magnet 22a, the guide magnet 23a, the magnetic induction module 25a, the third positioning magnet 31a, and the magnetic element 32a. In order to simplify the description, other elements can directly refer to the first embodiment and use the same reference numerals, and the same reference numerals represent the elements having the same functions.

In the present embodiment, the first positioning magnet 21a is positioned on the first side edge 201, the second positioning magnet 22a is positioned between the first side edge 201 and the second side edge 202, and the distance S between the second positioning magnet 22a and the first positioning magnet 21a is equal to the moving distance M of the keyboard 30a, which is approximately equal to the width of the keyboard 30a. It should be noted that the moving distance M as shown in FIG. 7 is marked on the second display panel 20a, and the moving distance M is marked with reference to the sixth side edge 302 of the keyboard 30a. Furthermore, the magnetic induction module 25a is arranged adjacent to the second positioning magnet 22a and thus is positioned between the first side edge 201 and the second side edge 202. The third positioning magnet 31a is positioned on the fifth side edge 301. The second display panel 20a is only provided with one guide magnet 23a arranged on the third side edge 203. Correspondingly, the keyboard 30a is provided with one magnetic element 32a arranged on the fifth side edge 301.

When the keyboard 30a is in the first position P1, the first positioning magnet 21a positioned on the first side edge 201 and the third positioning magnet 31a positioned on the fifth side edge 301 can be magnetically attracted to each other, therefore, the keyboard 30a is fixed in the first position P1. The magnetic element 32a of the present embodiment is also strip-shaped, and the long axis direction of the magnetic element 32a is parallel to the moving direction D of the keyboard 30a, so the keyboard 30a can move from the first position P1 to the second position P2 along the moving direction D by the magnetic attraction force between the magnetic element 32a and the guide magnet 23a. Furthermore, because the distance S between the second positioning magnet 22a and the first positioning magnet 21a is equal to the moving distance M of the keyboard 30a, when the keyboard 30a moves to the second position P2, the third positioning magnet 31a moves to the position of the second positioning magnet 22a, the second positioning magnet 22a and the third positioning magnet 31a can be magnetically attracted to each other, and then, the keyboard 30a is fixed in the second position P2.

Figure 8:
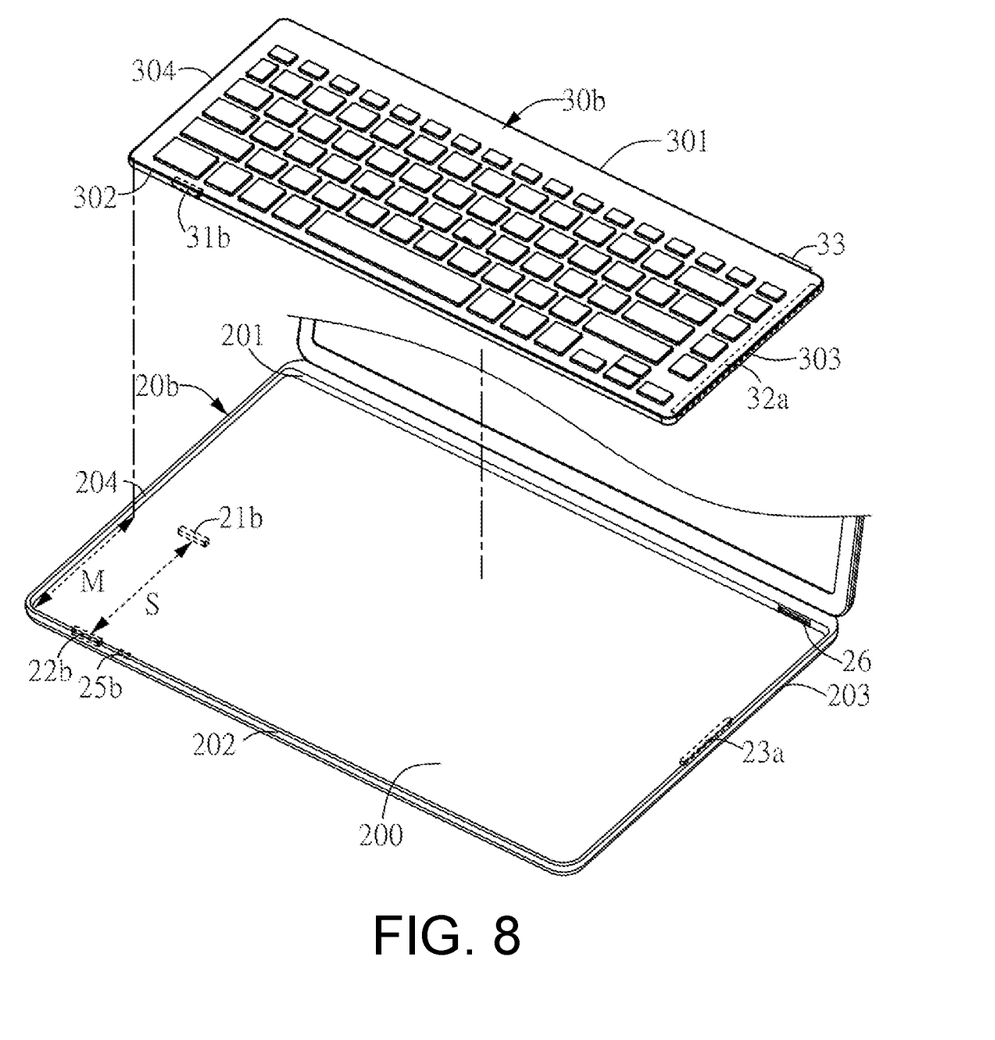
FIG. 8 is an exploded diagram of a second display panel and a keyboard according to a third embodiment of the present disclosure.

FIG. 8 is an exploded diagram of a second display panel and a keyboard according to a third embodiment of the present disclosure and the present embodiment refers to FIG. 8. The numbers of first positioning magnet 21b, second positioning magnet 22b, and third positioning magnet 31b of the present embodiment are the same as those of the second embodiment, but the arrangement positions are different. In order to simplify the description, other elements can directly refer to the first or second embodiment and use the same reference numerals, and the same reference numerals represent the elements having the same functions. In the present embodiment, the second positioning magnet 22b is positioned on the second side edge 202, the first positioning magnet 21b is positioned between the first side edge 201 and the second side edge 202, and the distance S between the first positioning magnet 21b and the second positioning magnet 22b is equal to the moving distance M of a keyboard 30b. Similarly, the moving distance M as shown in FIG. 8 is marked on the second display panel 20b, and the moving distance M is marked with reference to the sixth side edge 302 of the keyboard 30b. The third positioning magnet 31b of the present embodiment is positioned on the sixth side edge 302 of the keyboard 30b. A magnetic induction module 25b is arranged adjacent to the second positioning magnet 22b and is arranged on the second side edge 202.

When the keyboard 30b is in the first position P1, the third positioning magnet 31b positioned on the sixth side edge 302 and the first positioning magnet 21b can be magnetically attracted to each other, therefore, the keyboard 30b is fixed in the first position P1. When the keyboard 30b moves to the second position P2, the second positioning magnet 22b positioned on the second side edge 202 and the third positioning magnet 31b can be magnetically attracted to each other, therefore, the keyboard 30b is fixed in the second position P2. The arrangement relationship and the connection relationship between the guide magnet 23a and the magnetic element 32a of the present embodiment are the same as those of the second embodiment, so the reference numerals are used.

Figure 9:
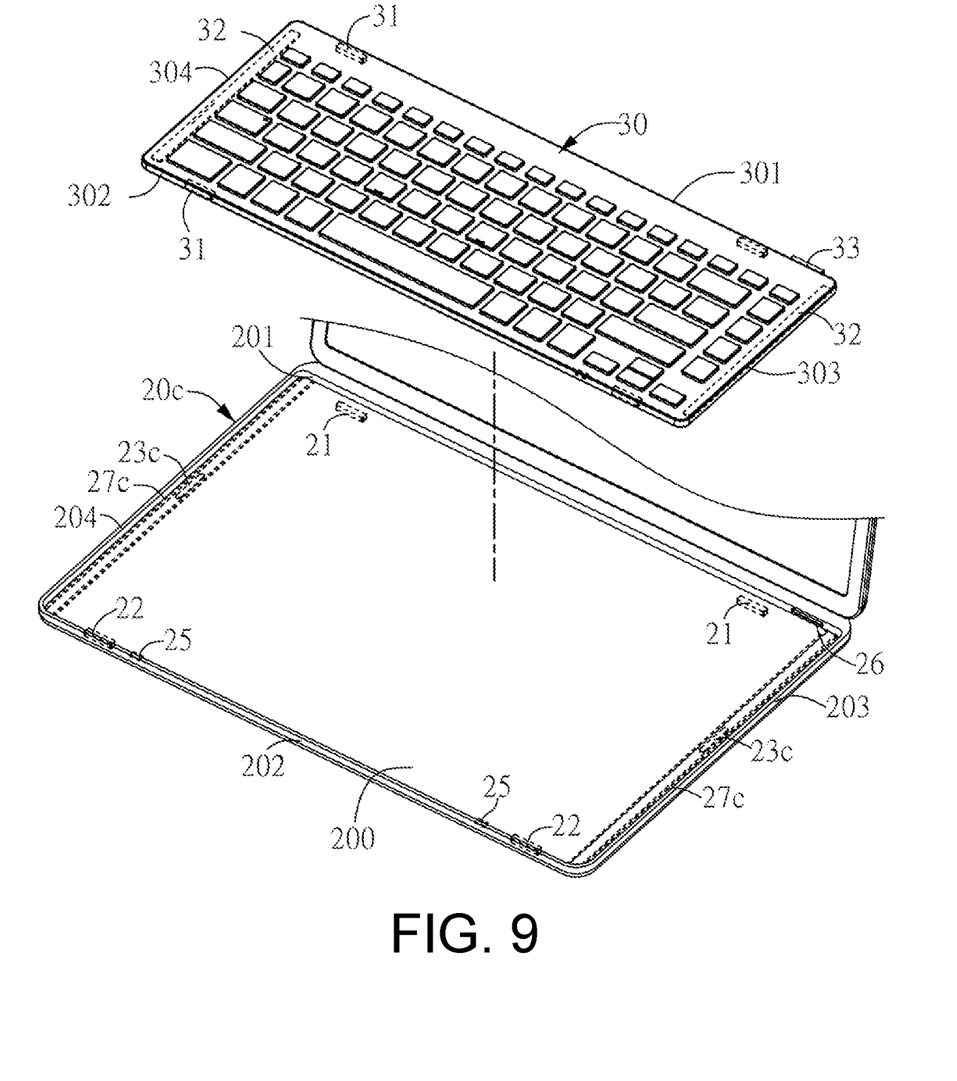
FIG. 9 is an exploded diagram of a second display panel and a keyboard according to a fourth embodiment of the present disclosure.

FIG. 9 is an exploded diagram of a second display panel and a keyboard according to a fourth embodiment of the present disclosure and the present embodiment refers to FIG. 9. The difference between the present embodiment and the first embodiment is that a second display panel 20c further comprises at least one slide rail 27c, and a guide magnet 23c can move in the slide rail 27c. In order to simplify the description, other elements can directly refer to the first embodiment and use the same reference numerals, and the same reference numerals represent the elements having the same functions. The slide rail 27c of the present embodiment is arranged below the display screen 200 of the second display panel 20c, and the slide rail 27c is parallel to the moving direction D. Specifically, in the present embodiment, slide rails 27c are arranged bilaterally, so the second display panel 20c is provided with two slide rails 27c which are respectively positioned on the third side edge 203 and the fourth side edge 204. Furthermore, guide magnets 23c are arranged in the slide rails 27c and can move in the slide rails 27c. The keyboard 30 of the present embodiment is the same as that of the first embodiment and thus uses the same reference numerals, and the keyboard 30 of the present embodiment is provided with two magnetic elements 32 which are respectively positioned on the seventh side edge 303 and the eighth side edge 304. When the keyboard 30 is arranged on the second display panel 20c, the guide magnets 23c and the magnetic elements 32 can be magnetically attracted to each other. When the keyboard 30 is moved, the magnetic elements 32 drive the guide magnets 23c to move along the slide rails 27c. The slide rail 27c is strip-shaped, and the long axis of the slide rail 27c is parallel to the moving direction D, so the keyboard 30 can be guided to move between the first position P1 and the second position P2 along the moving direction D. In other embodiments, the slide rail 27c can also be arranged unilaterally and is positioned on the third side edge 203 or the fourth side edge 204. Correspondingly, the magnetic element 32 is positioned on the seventh side edge 303 or the eighth side edge 304, and the effect of guiding the keyboard 30 to move can also be achieved.

In conclusion, the portable electronic device of the present disclosure is provided with the first display panel, the second display panel, and the keyboard, and the keyboard is detachably arranged on the second display panel, so that a user can directly operate the keyboard to achieve an effect of inputting with a physical keyboard. Furthermore, the second display panel comprises guide magnets, and the keyboard comprises magnetic elements, so that the keyboard can be controlled by the guide magnets and the magnetic elements to slide on the display screen.

Furthermore, the keyboard in different positions (first position or second position) can be used in different usage modes, so that the portable electronic device (dual-screen notebook computer) has more diverse usage modes.

The above embodiments are only used for explaining the technical idea and features of the present disclosure, and the objective of the present disclosure is to enable those skilled in the art to understand the contents of the present disclosure and to implement the present disclosure, but the scope of the present disclosure cannot be limited thereto. Equivalent variations or modifications made in accordance with the spirit of the present disclosure are intended to be included within the scope of the present disclosure.

What is claimed is:

1. A portable electronic device, comprising: a first display panel; a second display panel, pivotally connected to the first display panel and the second display panel comprising: a display screen; and at least one guide magnet arranged below the display screen; and a keyboard, detachably arranged above the display screen of the second display panel and the keyboard comprising: at least one magnetic element, wherein the keyboard can be controlled to move relative to the display screen along a moving direction by means of the magnetic attraction force between the at least one magnetic element and the at least one guide magnet, and the moving direction is perpendicular to a side edge of the second display panel pivotally connected to the first display panel; wherein the second display panel further comprises a first positioning magnet and a second positioning magnet being respectively arranged below the display screen of the second display panel and spaced apart on two opposite side edges; the keyboard further comprises a third positioning magnet; when the keyboard is in a first position on the display screen, the third positioning magnet and the first positioning magnet are magnetically attracted to each other and enable the display screen to be used in a first usage mode; and when the keyboard is in a second position on the display screen, the third positioning magnet and the second positioning magnet are magnetically attracted to each other and enable the display screen to be used in a second usage mode different from the first usage mode.

2. The portable electronic device according to claim 1, wherein the second display panel further comprises at least one slide rail arranged below the display screen of the second display panel, the at least one slide rail is parallel to the moving direction, and the at least one guide magnet is respectively arranged in the at least one slide rail.

3. The portable electronic device according to claim 1, wherein the second display panel comprises a first side edge, a second side edge, a third side edge, and a fourth side edge; the second side edge is opposite to the first side edge, the third side edge is opposite to the fourth side edge, and the first side edge is pivotally connected to the first display panel; the keyboard comprises a fifth side edge, a sixth side edge, a seventh side edge, and an eighth side edge; the sixth side edge is opposite to the fifth side edge, and the eighth side edge is opposite to the seventh side edge; when the keyboard is in the first position, the fifth side edge is close to the first side edge; and when the keyboard is in the second position, the sixth side edge is close to the second side edge.

4. The portable electronic device according to claim 3, wherein the first positioning magnet is positioned on the first side edge, the third positioning magnet is positioned on the fifth side edge, and a distance between the second positioning magnet and the first positioning magnet is equal to a moving distance of the keyboard.

5. The portable electronic device according to claim 3, wherein the second positioning magnet is positioned on the second side edge, the third positioning magnet is positioned on the sixth side edge, and a distance between the first positioning magnet and the second positioning magnet is equal to a moving distance of the keyboard.

6. The portable electronic device according to claim 3, wherein the second display panel is provided with at least two guide magnets being spaced apart on the third side edge or the fourth side edge, and the magnetic element is positioned on the seventh side edge or the eighth side edge.

7. The portable electronic device according to claim 1, wherein the second display panel further comprises a processing module and a magnetic induction module, the magnetic induction module is electrically connected to the processing module, and the magnetic induction module is arranged adjacent to the second positioning magnet.

8. The portable electronic device according to claim 7, wherein the second display panel further comprises a first connector being electrically connected to the processing module; the keyboard further comprises a second connector; and when the keyboard is in the first position, the first connector is electrically connected to the second connector, and the processing module receives a connection signal.

9. The portable electronic device according to claim 7, wherein when the keyboard is in the second position, the third positioning magnet and the second positioning magnet are magnetically attracted to each other, the processing module receives an induction signal from the magnetic induction module.

10. The portable electronic device according to claim 1, wherein an upper surface of the display screen of the second display panel is a groove and the keyboard is contained in the groove.

11. The portable electronic device according to claim 1, wherein both the first display panel and the second display panel are touch display panels.

* * * * *